United States Patent [19]

Matthews

[11] 4,179,942

[45] Dec. 25, 1979

[54] VARIABLE RATIO CRANK ASSEMBLY

[76] Inventor: Leslie C. Matthews, 203-2033-11th Ave.SW., Calgary, Canada, T3C 0P2

[21] Appl. No.: 867,874

[22] Filed: Jan. 9, 1978

[51] Int. Cl.[2] ........................................ F16H 21/18

[52] U.S. Cl. ........................................ 74/43; 74/393

[58] Field of Search ........................ 74/43, 52, 393; 123/197 AC

[56] References Cited

U.S. PATENT DOCUMENTS

| | | | |
|---|---|---|---|
| 1,191,827 | 7/1916 | Reese | 123/197 AC |
| 2,088,332 | 7/1937 | Marchou | 74/52 |
| 3,686,972 | 8/1972 | McWhorter | 74/602 |

*Primary Examiner*—C. J. Husar
*Assistant Examiner*—Conrad Berman
*Attorney, Agent, or Firm*—Stanley G. Ade

[57] ABSTRACT

The lower end of a crank from an internal combustion engine is pivoted on one side of the center of a small gear which in turn is mounted for rotation to one side of the center of a relatively large drive gear. A stationary gear is concentric with the drive gear and an idler gear is mounted for rotation to the drive gear and engages the small gear and the stationary gear. The drive gear engages a take-off gear to transmit power from the piston via the crank and gears. The gear ratio of the small connecting rod gear and fixed gear is such that the small gear rotates at twice the speed of the large gear. The connecting pin of the small gear is furthest from the center of the drive gear at top dead center and bottom dead center and nearest to the center at 90° from top dead center and bottom dead center so that when at top dead center, the crank has the highest mechanical advantage and at 90° therefrom, the lowest mechanical advantage. This means that the piston is slowed down at the center of its stroke thus giving a change of ratio within the engine at each power stroke as well as during the other three strokes.

11 Claims, 3 Drawing Figures

VARIABLE RATIO CRANK ASSEMBLY

BACKGROUND OF THE INVENTION

This invention relates to new and useful improvements in variable ratio crank assemblies for internal combustion engines and the like.

It is well known that certain advantages can accrue from having a variable ratio crank system for internal combustion engines and attempts have been made in the past to provide this variable ratio crank.

For example, U.S. Pat. Nos. 3,686,972 and 1,191,827 employ eccentrically mounted or elliptical gears to provide this action. However, these are difficult to manufacture and to balance so that vibration is eliminated. Furthermore, the expense of manufacturing such eccentric or elliptical gears, is considerable.

SUMMARY OF THE INVENTION

The present invention overcomes these disadvantages by providing a gear connection between the connecting rod and the drive wheel. One aspect of the invention consists of a relatively large drive wheel, means to journal said drive wheel for rotation, and means operatively connecting said drive wheel to said connecting rod. Said means includes a stationary gear concentric with said drive wheel and having a diameter less than the drive wheel, a relatively small connecting rod gear, and means journalling said connecting rod gear for rotation upon one face of said drive wheel in a position between the axis of said drive wheel and the perimeter thereof. Said connecting rod is pivotally secured by the other end thereof to one side of said connecting rod gear in a position between the axis of said connecting rod gear and the perimeter thereof. Means are provided operatively connecting said connecting rod gear with said stationary gear. Means are also provided whereby the pivotal securement of said connecting rod to said connecting rod gear is nearest to the perimeter of the said drive wheel at top dead center and bottom dead center of said piston and nearest to the axis of said drive wheel at a position 90° of rotation from top dead center and bottom dead center.

This permits the connecting rod gear to turn at twice the speed of the drive wheel or gear so that as the drive wheel rotates one-quarter turn from top dead center, to 90° after top dead center, the connecting rod gear rotates one-half turn, bringing the point of pivotal connection of the connecting rod to the connecting rod gear, closer to the axis of the drive wheel. This means that the connecting rod or crank will have the highest mechanical advantage at the beginning of the stroke and the lowest mechanical advantage at the middle of the stroke. At the end of the stroke, that is bottom dead center, the mechanical advantage has returned to what it was at the beginning of the stroke at top dead center.

This gives a change of ratio inside the engine on each power stroke inasmuch as the piston will be moving at its slowest and can use a high mechanical advantage in turning the crank shaft or drive wheel whereas at the middle of the stroke, when the piston is moving fastest, it can use a lower mechanical advantage. The result of this will be greater efficiency and an overall lower engine speed for a given power performance.

With the foregoing in view, and other advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

In the drawings like characters of reference indicate corresponding parts in the different figures.

DETAILED DESCRIPTION

Figure 1:
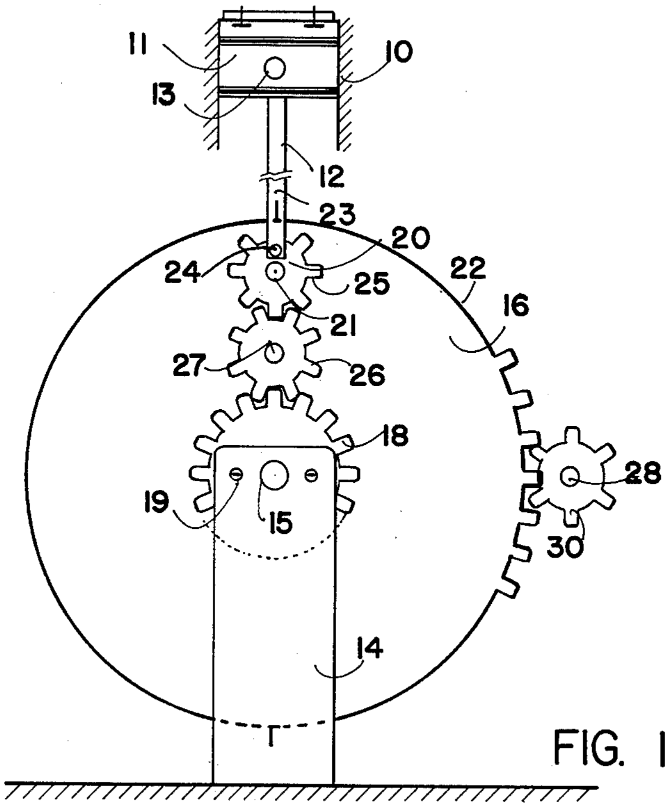
FIG. 1 is a schematic side elevation of one connecting rod and gear assembly shown at top dead center of the power and intake strokes.

Proceeding therefore to describe the invention in detail, reference character 10 illustrates schematically, a conventional cylinder having a piston 11 reciprocal therein and being connected by the upper end thereof to a connecting rod 12 by means of connecting rod bearing 13, all of which is conventional.

Mounted upon supporting structure 14, which is shown schematically, is a main shaft 15 with a plurality of drive wheels or drive gears 16 journalled thereon.

Figure 3:
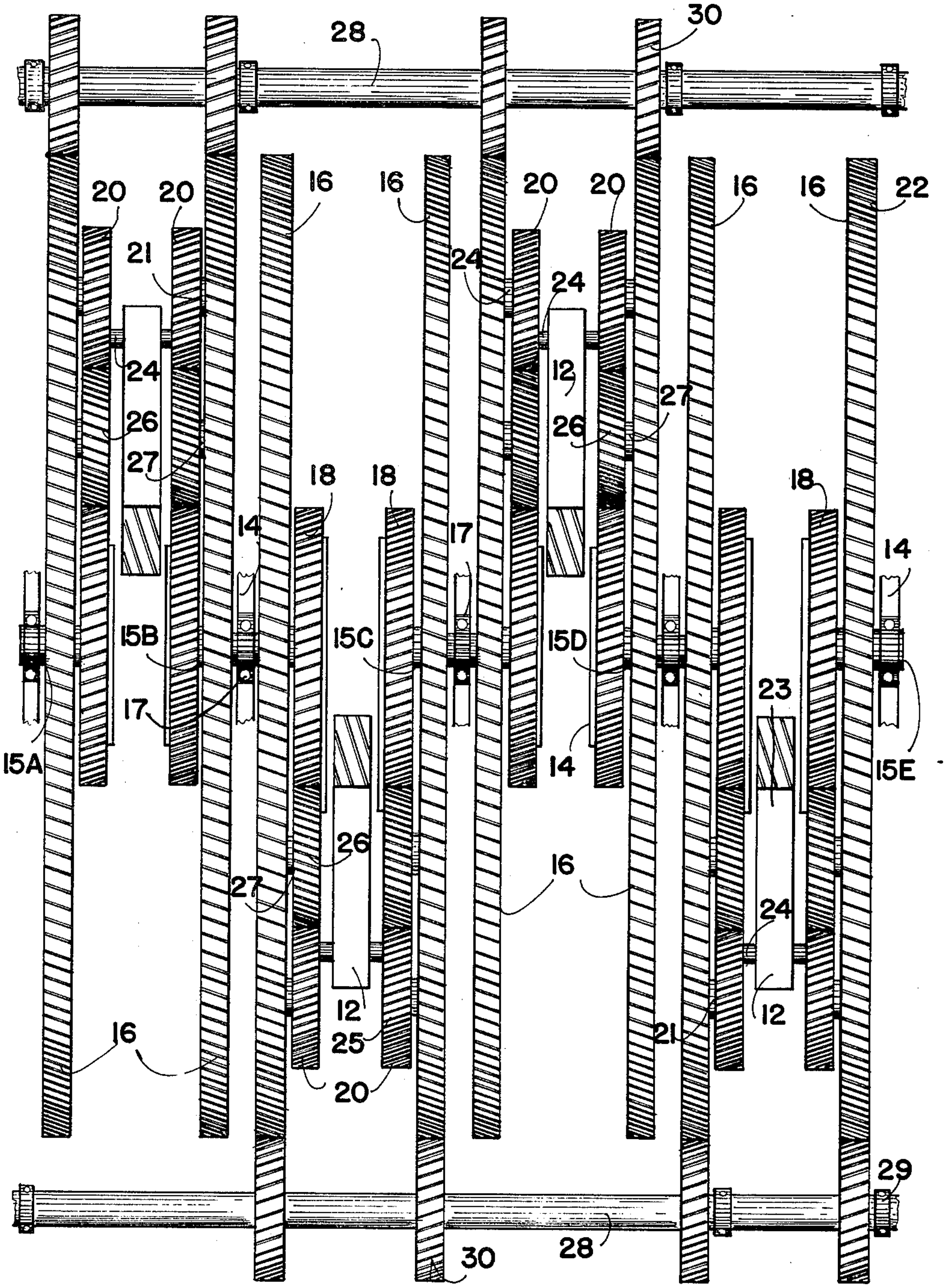
FIG. 3 is a partially schematic top plan view of the preferred arrangement showing two gear assemblies for each connecting rod and hence each piston and cylinder assembly.

A pair of drive gears 16 is provided for each piston and cylinder assembly and in FIG. 3, four such pairs of drive wheels are illustrated. It will be appreciated that the shafts 15 are mounted upon support structure 14 by means of bearings 17 but that the shaft 15 is not continuous because of the rotation of the lower end of crank or connecting rod 12. Therefore, in FIG. 3, the individual support shafts 15 are indicated as 15A, 5B, 15C, 15D and 15E respectively.

A fixed or stationary gear 18 is secured to the support member 14 adjacent the inner faces of each of the drive wheels or gears 16 and concentric therewith, and screws or bolts 19 are illustrative of means to secure these fixed gears to the support structure.

A relatively small connecting rod gear 20 is journalled for rotation upon a crank pin 21 extending from the facing sides of each pair of drive gears 16 and these crank pins are situated between the axis of the drive gear represented by the shaft 15 and the periphery 22 of the drive gear. The connecting rod gears 20 are mounted for free rotation upon the crank pin 21 in a conventional manner.

The lower end 23 of the connecting rod or crank 12 is pivotally connected by a pin 24 which in turn extends from the face of the connecting rod gear 20, between the axis as defined by the center of crank pin 21, and the periphery 25 thereof as clearly illustrated in FIG. 1.

An idler gear 26 is freely mounted upon a pin 27 extending from the face of gear 16 and meshes with both the connecting rod gear 20 and the fixed gear 18 and the gear ratios of the connecting rod gear 20 and the fixed gear 18 are such that the connecting rod gear rotates at twice the speed of the drive gear 16 when the engine is in operation.

Figure 2:
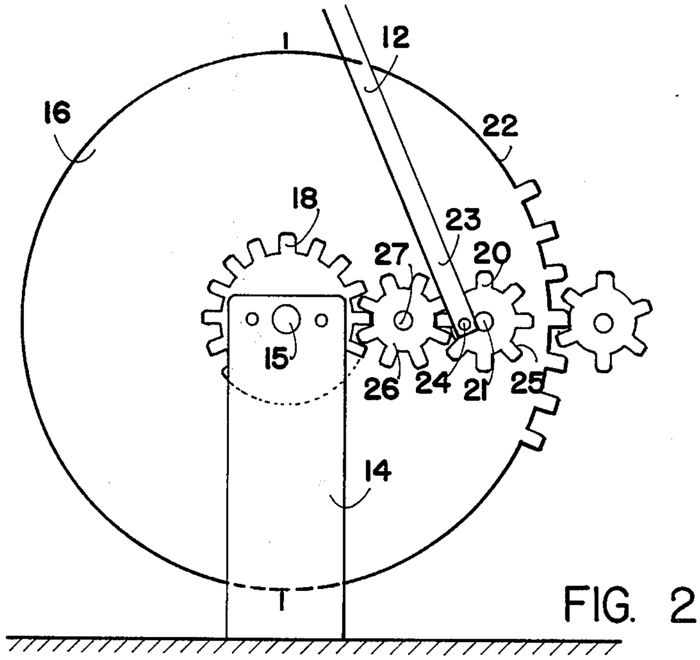
FIG. 2 is a view similar to FIG. 1, but showing the assembly at 90° therefrom.

A take-off shaft 28 is supported by bearings 29 and carries a take-off gear 30 meshing with the drive gear 16, all of which is clearly shown in FIGS. 1 and 2.

It is desirable that the assembly be similar to that shown in FIG. 3 in which each connecting rod 12 and hence each piston and cylinder assembly, is provided with a pair of spaced and parallel drive gears or wheels 16, a pair of fixed or stationary gears 18 and corresponding pairs of connecting rod gears and idler gears 20 and 26 respectively, with the pair of connecting rod gears extending one upon each side of the end 23 of the connecting rod as clearly shown. This gives adequate support and reduces vibration. Furthermore, when a plurality of piston and cylinder assemblies are provided, alternate pairs of drive gears 16 may be connected to take-off shafts 28 situated upon either side diametrically opposite to one another as clearly illustrated in FIG. 3.

This arrangement enables the take-off shafts and gears to synchronize the rotation of the pairs of drive gears 16 on each crank and also keep each crank in the same position relative to the others.

It will be noted that the crank pin 24 is closest to the periphery 22 of the drive gear when the drive gear is at top dead center and bottom dead center and that it is closest to the axis 15 when the crank or connecting rod gears are at 90° to the two positions. This means that the piston speed is reduced at the middle of each stroke as compared with a conventional engine of the same stroke thus assisting in the reduction of friction and wear. Since the crank throw is reduced at the middle of each stroke, the angle at the wrist pin of the connecting rod will be less. This in turn will result in less side thrust by the piston on the cylinder walls and will assist in giving an additional reduction in friction and wear.

At the middle of the power stroke or at 90° from top dead center, the piston will have a reduced mechanical advantage in driving the crank shaft. However, on the other strokes, the reduced throw at the middle of the stroke will give the crank shaft a higher mechanical advantage in moving the pistons through these strokes as compared to a conventional engine of the same stroke.

Particularly on the compression stroke, the momentum of the crank shaft should make it easier to overcome resistance of the pistons and will result in less power being consumed while going through the other three strokes, namely the exhaust stroke, the intake stroke, and the compression stroke.

Because the maximum speed attained by the piston will be less compared to a conventional engine having the same stroke and rotating at the same speed, there will be less excess momentum left at the end of each stroke which will result in less vibration and less strain and wear on the crank shaft bearings.

It is believed that the power will be greater and the internal drag and friction will be less.

The relative position of the crank pin 24 and the connecting rod gear 20 is shown clearly in FIGS. 1 and 2, and this will be repeated at 180° and 270° from top dead center.

It will be appreciated that it would be possible to get a change of ratio by eliminating the idler gear 26 and having the connecting rod gear 20 meshing directly with the stationary or fixed gear 18. However, it is believed that this is undesirable because at the middle of the stroke, the attachment point 24 of the connecting rod would be moving upwardly with respect to the center of the connecting rod gear whereas at the beginning of the stroke, it will move downwardly. This would result in an abrupt reduction in the speed of the piston and connecting rod and is likely to cause rough running.

In order to turn it at twice the speed of the drive gear 16, the connecting rod gear would have to be half the diameter of the stationary or the fixed gear 18.

However, as hereinbefore described, it is believed more desirable to utilize the structure described including the idler gear 26.

Referring back to the embodiment which includes two take-off shafts 28 as shown in FIG. 3, these are required only if it is desired to have successive cranks counter rotating.

In this case, it would be necessary to connect the two take-off shafts by gears (not illustrated) so as to preserve the correct rotational position of successive cranks relative to each other.

Of course, if all of the cranks are to rotate in the same direction, only one take-off shaft is required and all of the take-off gears could then be on the same shaft.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In an internal combustion engine which includes supporting structure, at least one piston reciprocal within a cylinder and a connecting rod operatively connected by one end thereof to said piston and extending from said cylinder; the improvement comprising in combination a relatively large drive wheel, means to journal said drive wheel for rotation, means operatively connecting said drive wheel to said connecting rod, said means including a stationary gear concentric with said drive wheel and having a diameter less than the drive wheel, a relatively small connecting rod gear, means journalling said connecting rod gear for rotation upon one face of said drive wheel in a position between the axis of said drive wheel and the perimeter thereof, said connecting rod being pivotally secured by the other end thereof to one side of said connecting rod gear in a position between the axis of said connecting rod gear and the perimeter thereof, and means operatively connecting said connecting rod gear with said stationary gear and means whereby the pivotal securement of said connecting rod to said connecting rod gear is nearest to the perimeter of the said drive wheel at top dead center and bottom dead center of said piston and nearest to the axis of said drive wheel at a position 90° of rotation from top dead center and bottom dead center.

2. The improvement according to claim 1 in which said drive wheel is in the form of a gear wheel, and includes a take-off gear operatively connected to said drive gear, and shaft means supporting said take-off gear.

3. The improvement according to claim 1 in which said means operatively connecting said connecting rod gear with said stationary gear comprises a relatively small idler gear journalled for rotation upon said one face of said drive wheel and meshing with said connecting rod gear and said stationary gear.

4. The improvement according to claim 3 in which said drive wheel is in the form of a gear wheel, and includes a take-off gear operatively connected to said drive gear, and shaft means supporting said take-off gear.

5. The improvement according to claim 3 in which said means whereby the pivotal connection of said connecting rod to said connecting rod gear is nearest to the perimeter of said drive wheel gear at top dead center and bottom dead center and nearest to the axis of said drive wheel at a position 90° of rotation from top dead center and bottom dead center, includes a gear ratio between said connecting rod gear and said stationary gear whereby said connecting rod gear rotates at twice the speed of said drive wheel.

6. The improvement according to claim 5 in which said drive wheel is in the form of a gear wheel, and includes a take-off gear operatively connected to said drive gear, and shaft means supporting said take-off gear.

7. The improvement according to claim 3 includes at least two piston and cylinder assemblies in side by side relationship, a pair of drive wheels for each piston and cylinder assembly in spaced apart relationship, said connecting rod of each piston and cylinder assembly extending between the corresponding pair of drive wheels, a connecting rod gear on each side of said connecting rod, each connecting rod gear being pivotally secured to one each of said drive wheels, a fixed gear for each drive wheel and an idler gear operatively connected to each connecting rod gear and the corresponding stationary gear.

8. The improvement according to claim 7 in which said drive wheels are in the form of gear wheels, the take-off shaft on each side of said drive wheels being diametrically opposite to one another, a pair of take-off gears upon each of said take-off shafts, one pair of take-off gears being operatively connected to one pair of drive gears, the other pair of said take-off gears being operatively connected to the other pair of said drive gears, and gears operatively connecting between said take-off shafts.

9. The improvement according to claim 1 in which said means whereby the pivotal connection of said connecting rod to said connecting rod gear is nearest to the perimeter of said drive wheel gear at top dead center and bottom dead center and nearest to the axis of said drive wheel at a position 90° of rotation from top dead center and bottom dead center, includes a gear ratio between said connecting rod gear and said stationary gear whereby said connecting rod gear rotates at twice the speed of said drive wheel.

10. The improvement according to claim 9 in which said drive wheel is in the form of a gear wheel, and includes a take-off gear operatively connected to said drive gear, and shaft means supporting said take-off gear.

11. The improvement according to claim 9 includes at least two piston and cylinder assemblies in side by side relationship a pair of drive wheels for each piston and cylinder assembly in spaced apart relationship, said connecting rod of each piston and cylinder assembly extending between the corresponding pair of drive wheels, a connecting rod gear on each side of said connecting rod, each connecting rod gear being pivotally secured to one each of said drive wheels, a fixed gear for each drive wheel and an idler gear operatively connected to each connecting rod gear and the corresponding stationary gear.

* * * * *